A. BLOOD, Sr.
Bee Hive.
No. 22,059.
Patented Nov. 16, 1858.
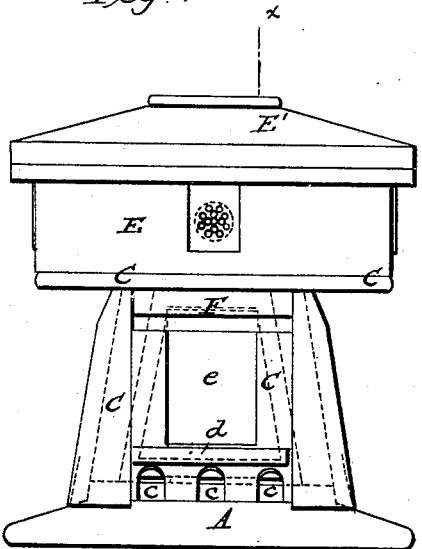
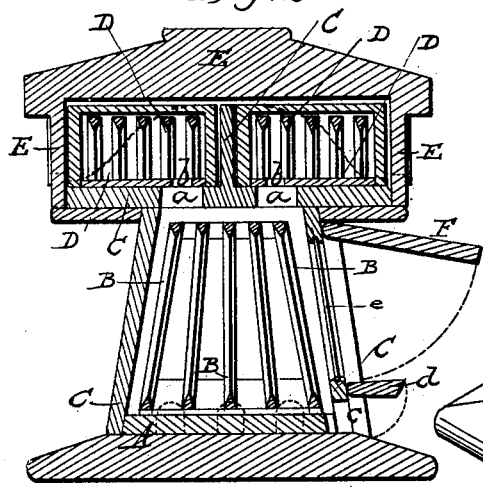
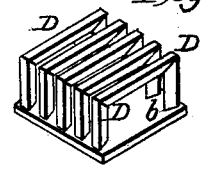
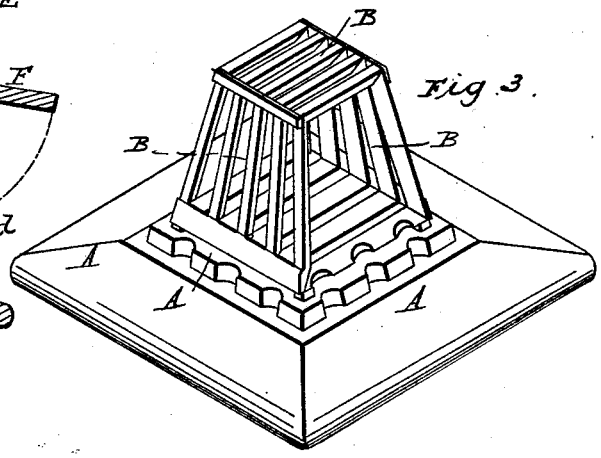
Attest.
G. C. Humphries
K. N. Steele
Inventor.
Asa Blood Sen.

UNITED STATES PATENT OFFICE.

ASA BLOOD, SR., OF NORFOLK, VIRGINIA.

BEEHIVE.

Specification of Letters Patent No. 22,059, dated November 16, 1858.

*To all whom it may concern:*

Be it known that I, ASA BLOOD, Sr., of the city and county of Norfolk, in the State of Virginia, have invented a new and useful Improvement in Beehives; and I do hereby declare the following to be a full and exact description thereof.

The nature of my invention consists in so constructing a hive that the breeding bees are separated from the working bees, while the honey made can be removed without disturbing the bees.

Figure 1 is an elevation of the hive; Fig. 2 is a vertical cross section on the line $x$—$x$ of Fig. 1; Figs. 3 and 4 are perspective views of parts in detail.

A Figs. 1, 2 is the base, or pedestal of the hive, on which rests the breeding core, or household department B, shown uncovered in Fig. 3. The breeding core B may be made as represented or it may be rectangular with its sides parallel instead of being pyramidal. The case C is of a form to inclose and surround the breeding core B and has in its top, above the core holes $a$ $a$ through which the bees may pass in order to get to work at depositing honey in the honey cores D, shown also in Fig. 4. Of these (D) there are generally four but there may be more or less; they rest on the top of the case C, and are inclosed within a cap or cover E, E′, which comes down over them and also rests on the top of the case C. That portion of the cap marked E′ may be hinged to the sides E so as to allow it to be lifted without entirely removing it. The bottoms of the cores D, have holes $b$ $b$ Figs. 2 and 4 which are immediately over the holes $a$ $a$ in the top of the case C. Near the bottom of the case C and on three sides of it are small openings $c$ $c$ covered by a flap door $d$, Figs. 1 and 2, through which the bees pass in and out of the hive. In one of the sides of the case C is also a glass window $e$, covered by a falling shutter F.

The breeding core B and honey core D are made of frame work as shown; the cross section of the bars composing them being triangular in order to allow the bees plenty of room wherein to secure their cells between the sides of the bars. In the honey cores D, the bars forming them are placed so near together as to prevent the bees from passing between them.

When it is desired to remove the honey, a piece of tin or other thin material is slid in between the top of the case C and the bottom of the honey core D so as to shut off communication between them through the holes $a$ $a$ when the core may be removed and an empty one which should be at hand, put in its place.

When it is required to clean the old comb out from the breeding core B, the case C with the honey cores D surrounded and covered by the cap E, E′, is removed so as to leave the core B precisely as seen in Fig 3. The case C with its adjuncts being placed conveniently near, the bees will leave the breeding core and go into the case C, when the old comb in the breeding core may be cleaned out, leaving walls of honey around on the bars after which it is to be covered again by the case C; thus giving a chance for the bees to form a new colony in the breeding core B to enable the young bees to attain to a proper growth and strength. In this manner bees may be kept for twenty years without their ever dying out; the cells being kept large and free by cleaning out the old comb as described being conducive to this end.

Having thus fully described my invention, what I claim therein as new and desire to secure by Letters Patent is—

The main or breeding core B, in inclosing case C, in combination with the honey cores D, in cap E, the several parts being constructed and arranged in the manner and for the purposes herein specified.

ASA BLOOD, SENR.

Witnesses:
GUY C. HUMPHRIES,
J. C. CLAYTON.